Mar. 27, 1923. 1,449,488.
F. L. BALL.
BEARING.
FILED DEC. 22, 1920. 2 SHEETS—SHEET 2.
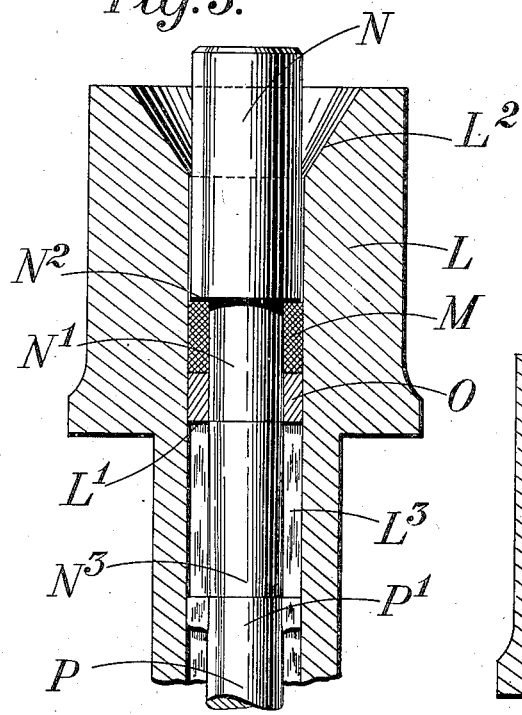
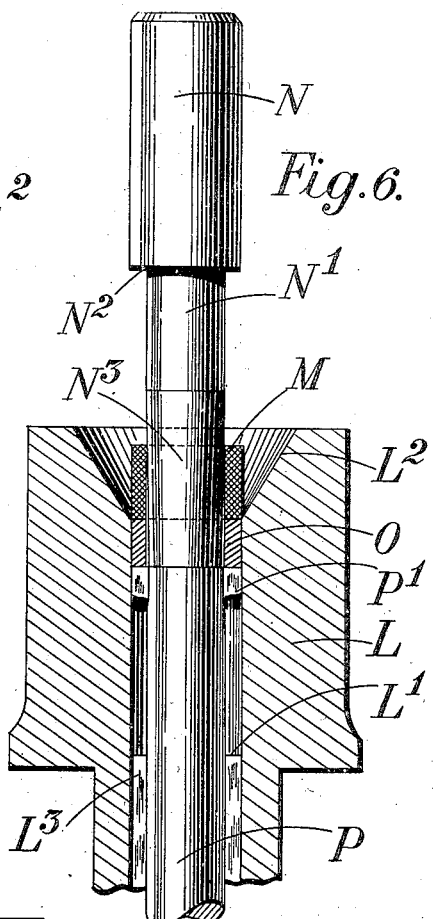
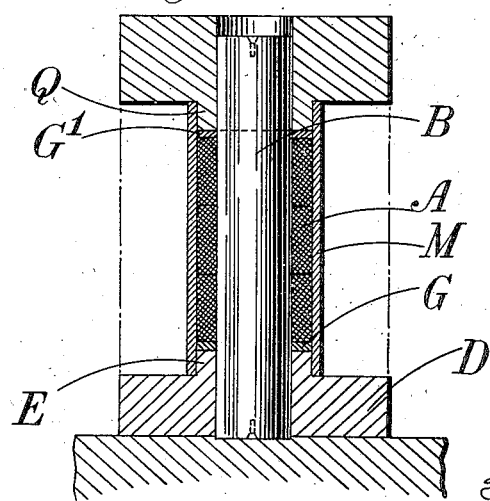
Inventor
Frederick Leonard Ball,
by Bakewell, Byrnes & Parmelee
his Attys.

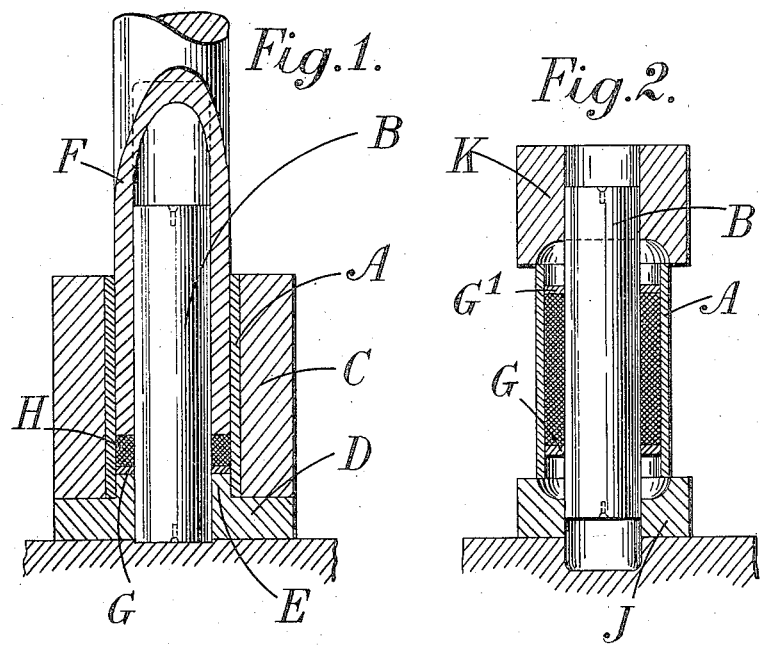
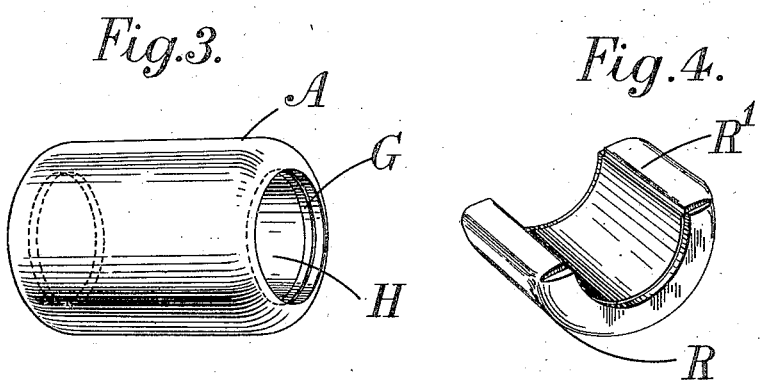

Patented Mar. 27, 1923.

1,449,488

UNITED STATES PATENT OFFICE.

FREDERICK LEONARD BALL, OF MAIDSTONE, ENGLAND.

BEARING.

Application filed December 22, 1920. Serial No. 432,436.

*To all whom it may concern:*

Be it known that I, FREDERICK LEONARD BALL, a subject of the King of England, residing at Maidstone, Kent, in England, have invented certain new and useful Improvements in Bearings, of which the following is a specification.

This invention comprises improvements in or relating to bearings. The invention has for its object to provide a simple and satisfactory tubular self-lubricating bushing for bearings, particularly small bearings, such as the subsidiary bearings of engines or the bearings of joints in link-work, shackles, change-speed-gear parts and bearings where there is comparatively little rotative motion, which frequently are difficult to lubricate, or at any rate receive scant attention.

According to this invention a compound bushing for a bearing, comprising an outer tube, with or without inturned edges, and an inner lining which provides the bearing surface, is characterized by the lining consisting of antifriction or other suitable metal in subdivided form (for example, in the form of threads or granules) mixed with a solid lubricant and consolidated by pressure.

It has previously been proposed to produce a bearing consisting of an outer tubular member between which outer member and an inner relatively movable member is interposed a lubricating bushing of compressed but expansible fibrous material, impregnated with lubricant and held in place by flanges, which may be inturned from the outer tubular member. Owing to the nature of the fibrous bushing it was to act expansively upon the members of the bearing with a substantially equal radial pressure throughout its entire length.

The present invention will be readily distinguished inasmuch as the metallic lining is not expansible but is on the contrary consolidated by the pressure. The solid lubricant, preferably graphite, provides for the lubrication of the bearing throughout its entire life, without requiring attention.

It has now been found that such bearings, embodying this invention, are particularly satisfactory when the lining metal consists of granules of anti-friction metal produced by stirring a bath of molten metal, the upper surface of which is covered with finely divided graphite. The stirring serves to reduce the molten metal to a granulated condition, each of the granules being covered on its surface with a fine layer of graphite.

In manufacture the anti-friction metal is melted and covered with a layer of finely powdered graphite, the quantity of graphite by volume being 4 or 5% of the molten metal. The molten metal is then removed from the source of heat and stirred or agitated to break it up into granules and disseminate the graphite throughout the cooling molten mass.

The size of the resulting coated granules depends upon the nature and vigour of the agitation and generally the granules used in the bearings are such as to pass a screen having from 8 to 30 meshes per lineal inch.

Preferably, the graphite-covered metallic granules are mixed with additional granules of graphite, which may be of approximately the same size as the metallic granules, prior to consolidation in the bearing.

In the accompanying drawings which illustrate by way of example means of manufacturing bearings according to this invention:

Figure 1 is an elevation partly in central section of a device for filling the anti-friction metal into the outer tube;

Figure 2 is an elevation partly in central section of a device for upsetting the ends of the outer tube;

Figure 3 is a perspective view of a complete finished bearing; and

Figure 4 is a perspective view of a semi-cylindrical bearing;

Figure 5 is an elevation partly in central section of an alternative form of device for making up the anti-friction lining;

Figure 6 is a similar view of the same device in another position; and

Figure 7 is an elevation partly in central section of a device for introducing the completed lining into the tubular casing.

Referring first to Figures 1–4. A length of steel tube for the outer tube of the bush and slightly longer than the finished length of the bearing, to allow for the turnings in of its edges to retain the metal in place, is taken and set up in a press machine concentric with a mandrel B, of a size corresponding with the desired bore of the bush. Preferably, the tube is arranged within a supporting housing C engaging the outer surface of said tube A so that it cannot be deformed under pressure. The housing, tube and bush may be held concentric with one another, by any suitable means, for example a base plate D having a central hole which fits the mandrel may be employed, and a boss or spigot E provided standing up from the base plate D concentric with the hole for the mandrel, of such a diameter that the bore of the tube A fits closely around it. The tube is fitted over the spigot and the supporting housing slipped over the tube. The spigot thus projects into the tube a short distance and its height is made such that the resulting projection of the bottom edge of the tube beyond its lining of anti-friction metal provides the required amount of metal for subsequently inturning the edge. The press has a hollow ram F of such a size that it can pass down into the annular space between the mandrel B and the tube A surrounding it.

The lining metal for the bearing is preferably in the form of a thread or narrow ribbon which is wound round the mandrel where it projects above the tube and housing. Before winding on the lining metal proper a metal retaining washer G preferably of anti-friction metal is slipped over the mandrel and down to the bottom of the space between the mandrel and the tube. A number of turns of the metal are now wound on the mandrel and then pressed down into place by the hollow ram as shown at H. The ram is then raised and a further section of metal wound on and pressed into place. If desired, several sections may be wound on and pressed down loosely by a hand tool, but in any case the ram of the press is brought down from time to time to exert a considerable pressure, amounting to as much as 10 to 20 tons per square inch, upon the metal H and consolidate it. When the last section of metal has been wound on and consolidated, a second washer G¹ of anti-friction metal is pressed home above it.

The graphite, for lubrication, is preferably applied by coating the metal threads with the lubricant before winding them in place.

The next operation is that of turning in the ends of the tube A over the retaining washers G, G¹ as shown in Figure 2. This may be effected by means of two cup-shaped upsetting tools J, K, applied axially one to each end of the tube A. The mandrel B is left in place during this operation, but of course, to permit the application of the upsetting tools, the base plate D must be removed. The outer supporting housing C may be removed also, or it may be specially shaped at the ends to accommodate the upsetting tools so that it can be left in place to support the tube against the pressure.

The upsetting operation may be omitted if desired from one end of the bearing to provide a face of anti-friction metal against which bears a collar on the journal of the shaft which works within the bearing. In this case graphite may be incorporated in the retaining washer.

If great accuracy is desired in the bearing it may now be mounted by means of the mandrel B between centres in a lathe or grinding machine and machined on its outer surfaces perfectly concentric with the bore. The mandrel B is finally pressed out of the completed bush.

Instead of using thread or ribbons of anti-friction metal, granules coated or intermixed with graphite may be employed and consolidated by means of the above described hollow ram. The composition of anti-friction metal employed may be varied as desired; it is usually an alloy of copper or lead with tin and antimony. The lining may if desired consist of rings of graphite alternating with rings of consolidated anti-friction metal or alternate longitudinal bars of anti-friction metal, and graphite may be disposed within the outer tube to constitute the lining. The bore of the bush may be tapered if desired, to produce which the mandrel on which it is forced would be tapered correspondingly. In this case longitudinal movement of the inner bearing member within the bushing will suffice to take up wear.

When the ends of the tube or casing of the bearing are not inturned, suitable fixing means may be provided for the washers which retain the lining metal in place.

In a modified construction, rings of metal alternated with rings of graphite and set aslant to the axis of the bearing, may be used for the lining, the angle of the slant being approximately 45°. By this means every point in the periphery of a journal rotating in the bearing engages at some point in its revolution with the lubricating graphite. At the ends of the bearing, rings or part-rings cut to a wedge-shape are employed to support the complete rings in the centre of the bearing in their slantwise position, and complete the ends of the bearing as a true face. These rings may be of solid metal, or the metal rings may be formed of thin metal threads or ribbon as hereinbefore described. In the latter case they may be consolidated by a hollow ram in a press, the ram having its operative end cut off at the same angle as the slant of the rings.

The outer cover or casing of the bearing may be cast if desired with the inturned edge or edges already formed. When both edges are turned in this would prevent the introduction of a ram for consolidation and in that case, or if found preferable, the consolidation of the subdivided metal may be carried out by an expanding mandrel or internal rollers.

According to the present invention, instead of using a hollow ram sliding over a fixed central mandrel, the ram and the mandrel may be formed as one sliding member, one end of which forms the mandrel and is accurately machined to the size of the desired internal diameter of the bearing, but the body portion of which is of larger diameter, having a shoulder to constitute the ram and to consolidate the metal by engagement therewith.

Preferably, the steel tube within which the anti-friction metal lining is eventually encased, is omitted from the supporting housing in the consolidating operation, the consolidated lining being subsequently pressed into place therein while mounted on a mandrel.

Referring now to the arrangement illustrated in Figures 5 and 6, an outer supporting housing L is employed which can be set up on the table of a machine-press and the internal diameter of which is the same as the desired external diameter of the anti-friction metal lining M. Toward the bottom of the housing the internal diameter is reduced as at $L^1$ to that of the desired bore of the bush, thus forming an internal shoulder. The press carries a sliding member N the lower end portion $N^1$ of which is machined to the size of the desired internal diameter of the bearing but the body portion N of which is of larger diameter and fits accurately the larger portion of the bore in the supporting housing L. The end portion of this large part N of the sliding member forms a shoulder $N^2$ which constitutes a ram. The upper end of the bore in the supporting housing L is flared outwardly to form a funnel $L^2$ by means of which the granules may readily be filled into the annular space left between the reduced portion of the sliding member and the housing.

Before introducing the granules, a steel ring O is slipped down the bore to the shoulder $L^1$ within the housing, this ring being of such a diameter that externally it fits the housing and internally the reduced or mandrel portion $N^1$ of the sliding member, and thus serves to support the granules against the pressure of the ram.

In operation, a sufficient quantity of the granulated bearing material is fed into the annular space between the sliding member and the supporting housing, by means of the conical funnel $L^2$ at its upper end. The sliding member N is then forced down and consolidates the bearing metal M. When the sliding member rises, the friction between the mandrel portion $N^1$ of the member and the bearing M is less than the friction between the bearing M and the housing L, with the result that the bearing M remains against the steel ring O lying in the housing, while the mandrel slips upwardly through it. Advantage is taken of this to reduce the force with which the lining M grips the mandrel $N^1$ by slightly tapering the end portion $N^3$ of the mandrel to the extent of one or two thousandths of an inch. It is desired, however, to eject the consolidated lining M with the mandrel as it is withdrawn, and to this end an ejector P is arranged to follow the mandrel upwardly through the housing from below.

The bore of the housing below the ring where it abuts on the mandrel, is provided with two or more longitudinal slots $L^3$. The ejector P is provided with lateral pegs or projections $P^1$ which enter the slots $L^3$ so that when the ejector P is raised, the projections $P^1$ engage the steel ring O on its under-side and serve to lift it, together with the consolidated lining M, out of the housing. When so ejected, the lining is easily removed from the mandrel owing to the end portion thereof being tapered.

The next step is to insert the completed lining in the tubular casing as illustrated in Figure 7. This is effected by setting up the tube A on a base plate D provided with a spigot E which fits the bore of the tube A, and the height of which is equal to the amount by which the end of the tube must project beyond the lining to permit its ends to be subsequently inturned for retaining the lining in place. The centre of the spigot E is bored out to receive and support concentrically with the tubular casing, a mandrel B which fits the bore of the lining. Into the annular space between the mandrel and the outer tube, is first inserted a ring or washer G of solid anti-friction or other metal, then follows the consolidated lining M (which in the case of a long bearing, may be in several sections), and finally a second retaining washer $G^1$ of anti-friction or other metal. The lining is firmly pressed home by means of an annular tamping tool or ram Q. This operation may be effected in a press but the pressure required is not very great: it suffices, however, to expand the lining M tightly against the outer tubular casing A. If desired, the outer tubular casing may be inserted within a supporting housing in order to prevent any distortion. The ends of the tube are then inturned as described with reference to Figure 2, and the bearing is complete.

Referring to Figure 4, instead of having a single tubular casing, the casing may be split into two or more parts R longitudinally, and in this case the longitudinal edges of the outer part tubes are turned in as at $R^1$ like the ends. The lining in such cases may be consolidated either by axial pressure by means of a ram which is shaped to extend only partly round the mandrel, or by direct radial pressure of a ram having a curved end.

What I claim as my invention and desire to secure by Letters Patent is:—

1. A compound bearing-bush, comprising in combination an outer tube, and an inner liner that is held under compression therein and provides a bearing surface, which liner is composed of a mixture of anti-friction metal in subdivided form coated with a lubricant and solid lubricant consolidated under pressure in said tube, whereby the operative face of said liner is at all times composed of said consolidated mixture.

2. A compound bearing-bush, comprising in combination an outer tube and an inner liner that is held under radial compression therein and provides a bearing surface, which liner is composed of anti-friction metal in the form of threads coated with solid lubricant consolidated under pressure in said tube.

3. A compound bushing comprising in combination an outer tube, and an inner liner that is held in radial compression in said tube and provides a bearing surface, said liner being composed of anti-friction metal mixed while solid and in sub-divided form with solid lubricant, and consolidated under pressure in said tube whereby the operative face of said liner is at all times composed of said consolidated mixture.

In testimony whereof I have signed my name to this specification in the presence of two subscribing witnesses.

FREDERICK LEONARD BALL.

Witnesses:
ARTHUR J. THACKERY,
NELLIE E. HATTER.